US011862013B2

(12) United States Patent
Grimm et al.

(10) Patent No.: US 11,862,013 B2
(45) Date of Patent: Jan. 2, 2024

(54) METHOD OF MEASURING ROAD PERFORMANCE USING HEADWAY DYNAMICS

(71) Applicant: GM Global Technology Operations LLC, Detroit, MI (US)

(72) Inventors: Donald K. Grimm, Utica, MI (US); Richard Gordon, Canton, MI (US); Chuan Li, Warren, MI (US); Shu Chen, Rochester Hills, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 17/322,270

(22) Filed: May 17, 2021

(65) Prior Publication Data

US 2022/0366782 A1 Nov. 17, 2022

(51) Int. Cl.
*G08G 1/01* (2006.01)

(52) U.S. Cl.
CPC ......... *G08G 1/0145* (2013.01); *G08G 1/0133* (2013.01); *G08G 1/0141* (2013.01)

(58) Field of Classification Search
None
See application file for complete search history.

(56) References Cited

U.S. PATENT DOCUMENTS

2017/0184409 A1* 6/2017 Glasgow .......... G08G 1/096816
2017/0352262 A1* 12/2017 Xu ....................... G08G 1/0133
2022/0135039 A1* 5/2022 Jardine ........... B60W 30/18159 701/26

* cited by examiner

*Primary Examiner* — James M McPherson
*Assistant Examiner* — Bakari Underwood
(74) *Attorney, Agent, or Firm* — CANTOR COLBURN LLP

(57) ABSTRACT

A system, method and server for a controlling a relation between a vehicle and traffic flow over a road segment. The system includes a telemetric device of the vehicle and a processor of the server. The telemetric device obtains telemetric data related to the road segment being traversed by the vehicle. The processor determines a property of the road segment based on the telemetric data and a road profile for the road segment, determines a disruption score indicative of a level of disruption in the traffic flow for the road segment based on the property, and outputs a notification signal when the disruption score is above a selected disruption threshold. The notification signal is usable for controlling the relation between the vehicle and the traffic flow.

20 Claims, 7 Drawing Sheets

900

902 908 906 910

| | | | | Road Performance | | | | | | Key Performance Indicators | | | | | | KRI | Disput | AM | |
|---|---|---|---|---|---|---|---|---|---|---|---|---|---|---|---|---|---|---|---|
| dtlocdd | seg | hh | mm | veh | vObs | vAvg | vStd | vMin | vMax | refM | z_veh | z_vObs | z_vCV | _netHbraV | refM | Profile | Score | Rush | Event |
| 9/18/2019 | 1 | 7 | 4 | 26 | 68 | 121.70 | 7.26 | 104.82 | 134.79 | -4 | -0.42 | 0.41 | 0.61 | -0.01 | 4 | | 0 | TRUE | |
| 9/18/2019 | 2 | 7 | 4 | 29 | 137 | 121.34 | 8.19 | 99.07 | 138.23 | -4 | -0.64 | -0.57 | 0.44 | 0.63 | 4 | | 0 | TRUE | |
| 9/18/2019 | 3 | 7 | 4 | 33 | 170 | 118.51 | 12.77 | 82.94 | 139.38 | -4 | -0.94 | -1.05 | -0.04 | -0.15 | 4 | | 0 | TRUE | |
| 9/18/2019 | 4 | 7 | 4 | 33 | 192 | 110.27 | 26.78 | 1.14 | 135.94 | -4 | -0.94 | -1.36 | -2.49 | -2.25 | 4 | | 96 | TRUE | |
| 9/18/2019 | 5 | 7 | 4 | 31 | 168 | 99.58 | 42.83 | -0.01 | 137.08 | -4 | -0.79 | -1.02 | -2.52 | -1.66 | 4 | | 90 | TRUE | |
| 9/18/2019 | 6 | 7 | 4 | 26 | 130 | 122.42 | 7.55 | 103.68 | 145.14 | -4 | -0.42 | -0.47 | 0.58 | 0.08 | 4 | | 0 | TRUE | |
| 9/18/2019 | 7 | 7 | 4 | 25 | 95 | 122.60 | 8.18 | 102.52 | 152.07 | -4 | -0.34 | 0.03 | 0.54 | -0.13 | 4 | | 0 | TRUE | |
| 9/19/2019 | 1 | 7 | 4 | 20 | 56 | 120.11 | 8.92 | 99.07 | 141.70 | -4 | 0.03 | 0.59 | 0.44 | 0.28 | 4 | | 0 | TRUE | |
| 9/19/2019 | 2 | 7 | 4 | 33 | 120 | 118.64 | 7.93 | 95.23 | 141.69 | -4 | -0.94 | -0.33 | 0.32 | -0.18 | 4 | | 0 | TRUE | |
| 9/19/2019 | 3 | 7 | 4 | 39 | 213 | 113.15 | 11.86 | 63.36 | 140.53 | -4 | -1.39 | -1.66 | -0.63 | -0.74 | 4 | | 68 | TRUE | |
| 9/19/2019 | 4 | 7 | 4 | 40 | 255 | 103.77 | 25.18 | 2.31 | 137.08 | -4 | -1.47 | -2.27 | -2.45 | -3.88 | 4 | | 100 | TRUE | Crash |
| 9/19/2019 | 5 | 7 | 4 | 35 | 206 | 95.50 | 38.51 | 0.00 | 127.87 | -4 | -1.09 | -1.56 | -2.52 | -0.95 | 4 | | 91 | TRUE | |
| 9/19/2019 | 6 | 7 | 4 | 28 | 161 | 112.54 | 12.70 | 55.29 | 130.17 | -4 | -0.57 | -0.92 | -0.87 | -0.48 | 4 | | 18 | TRUE | |
| 9/19/2019 | 7 | 7 | 4 | 28 | 117 | 112.13 | 18.93 | 32.26 | 131.32 | -4 | -0.57 | -0.29 | -1.56 | 1.14 | 4 | | 0 | TRUE | |

904 912 914

| | | | | | |
|---|---|---|---|---|---|
| 20.40 | 96.63 | 117.76 | 10.36 | 84.44 | 134.25 |
| 13.35 | 69.77 | 6.79 | 8.09 | 33.46 | 9.74 |

FIG. 9

METHOD OF MEASURING ROAD PERFORMANCE USING HEADWAY DYNAMICS

INTRODUCTION

The subject disclosure relates to navigating a vehicle based on risk attributable to traffic conditions and, in particular, to evaluating a risk based on a condition or traffic flow and adjusting a route or heading of the vehicle to lower its risk or avoid the condition.

Autonomous vehicles monitor their surroundings in order to be able to navigate through traffic. While being able to evaluate their immediate surroundings, these vehicles are generally unaware of large-scale traffic issues outside of their immediate awareness. In particular, current navigation systems do not have the ability to assess traffic conditions as a whole and to determine a risk level of a roadway, such as level at which traffic may become unstable and pose a danger to the vehicle or hinder movement of the vehicle. Accordingly, it is desirable to be able to provide a vehicle with suitable knowledge of upcoming traffic conditions that can affect its mobility and safety.

SUMMARY

In one exemplary embodiment, a method of controlling a relation between a vehicle and traffic flow over a road segment is disclosed. Telemetric data is obtained from the vehicle within the road segment, the telemetric data being related to the road segment. A property of the road segment is determined based on the telemetric data and a road profile for the road segment. A disruption score indicative of a level of disruption in the traffic flow for the road segment is determined based on the property. A notification signal is output when the disruption score is above a selected disruption threshold, the notification signal being usable for controlling the relation between the vehicle and the traffic flow.

In addition to one or more of the features described herein, the method further includes outputting the notification signal to at least one of a display on a traffic monitoring device for analysis of the traffic flow, a sign to be displayed to the traffic flow, and the vehicle for navigating the vehicle with respect to the traffic flow. Navigating the vehicle further includes at least one of selecting an alternate route for the vehicle, changing a lane in which the vehicle is moving, changing a headway dynamic for the vehicle, changing a speed of the vehicle, and changing a speed profile of the vehicle. The method further includes accumulating the telemetric data from the vehicle at regular intervals while the vehicle is on the road segment, storing the accumulated telemetric data to a trace for the vehicle and determining the property of the road segment from the trace. The road profile represents an expected flow of traffic over the road segment in an absence of a disruptive event. The method further includes transmitting the telemetric data to a remote server and determining the property of the road segment and determining a disruption value at the remote server. The method further includes storing the properties in a road metrics database and purging the properties from the road metrics database after a selected time period has expired.

In another exemplary embodiment, a system for controlling a relation between a vehicle and a traffic flow over a road segment is disclosed. The system includes a telemetric device of the vehicle and a processor. The telemetric device of the vehicle obtains telemetric data related to the road segment being traversed by the vehicle. The processor is configured to determine a property of the road segment based on the telemetric data and a road profile for the road segment, determine a disruption score indicative of a level of disruption in the traffic flow for the road segment based on the property, and output a notification signal when the disruption score is above a selected disruption threshold, the notification signal usable for controlling the relation between the vehicle and the traffic flow.

In addition to one or more of the features described herein, the processor is further configured to output the notification signal to at least one of a display on a traffic monitoring device for analysis of the traffic flow, a sign to be displayed to the traffic flow, and the vehicle for navigating the vehicle with respect to the traffic flow. The processor is further configured to navigate the vehicle by performing at least one of selecting an alternate route for the vehicle, changing a lane in which the vehicle is moving, changing a headway dynamic for the vehicle, changing a speed of the vehicle, and changing a speed profile of the vehicle. The processor is further configured to accumulate the telemetric data from the vehicle at regular intervals while the vehicle is on the road segment, store the accumulated telemetric data to a trace for the vehicle and determine the property of the road segment from the trace. The road profile represents an expected flow of traffic over the road segment in an absence of a disruptive event. The system further includes a road metrics database, wherein the processor is further configured to store the properties in the road metrics database and purges the properties from the road metrics database after a selected time period has expired.

In yet another exemplary embodiment, a server for controlling a relation between a vehicle and a traffic flow over a road segment is disclosed. The server includes a processor configured to receive telemetric data from the vehicle, the telemetric data being related to the road segment being traversed by the vehicle, determine a property of the road segment based on the telemetric data and a road profile for the road segment, determine a disruption score indicative of a level of disruption in the traffic flow for the road segment based on the property, and output a notification signal when the disruption score is above a selected disruption threshold, the notification signal usable for controlling the relation between the vehicle and the traffic flow.

In addition to one or more of the features described herein, the processor is further configured to output the notification signal to at least one of a display on a traffic monitoring device for analysis of the traffic flow, a sign to be displayed to the traffic flow, and the vehicle for navigating the vehicle with respect to the traffic flow. The processor is further configured to navigate the vehicle by performing at least one of selecting an alternate route, changing a lane in which the vehicle is moving, changing a headway dynamic, changing a speed of the vehicle, and changing a speed profile of the vehicle. The processor is further configured to accumulate the telemetric data from the vehicle at regular intervals while the vehicle is on the road segment, store the accumulated telemetric data to a trace for the vehicle and determine the property of the road segment from the trace. The road profile represents an expected flow of traffic over the road segment in an absence of a disruptive event. The server further includes a road metrics database, wherein the processor is further configured to store the properties in the road metrics database and purges the properties from the road metrics database after a selected time period has expired. The processor is further configured to obtain the road profile from one of a plurality of other vehicles traversing the road segment and a profile service.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 9 shows a table showing various properties and related scaled or scored values.

DETAILED DESCRIPTION

Figure 1:
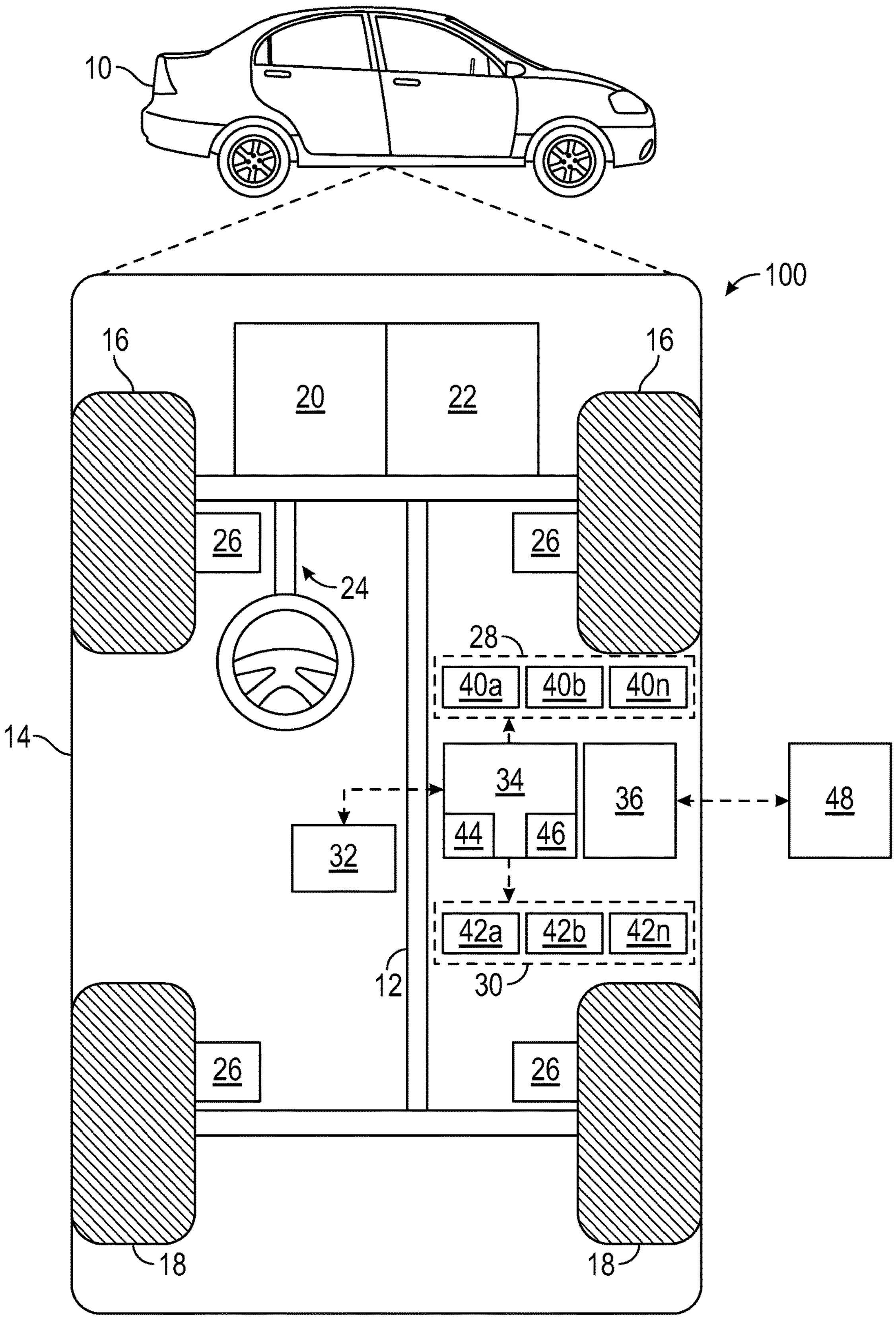
FIG. 1 shows a vehicle with an associated trajectory planning system depicted at in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40*a*-40*n* can includes sensors that monitor dynamic variables of the vehicle, such as its velocity, its acceleration, a number of times that the brake is applied, etc. The actuator system 30 includes one or more actuator devices 42*a*-42*n* that control one or more vehicle features such as, but not limited to, the propulsion system 20, the transmission system 22, the steering system 24, and the brake system 26.

The controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller is shown in FIG. 1, embodiments of the autonomous vehicle 10 can include any number of controllers that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the trajectory planning system 100 and, when executed by the at least one processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
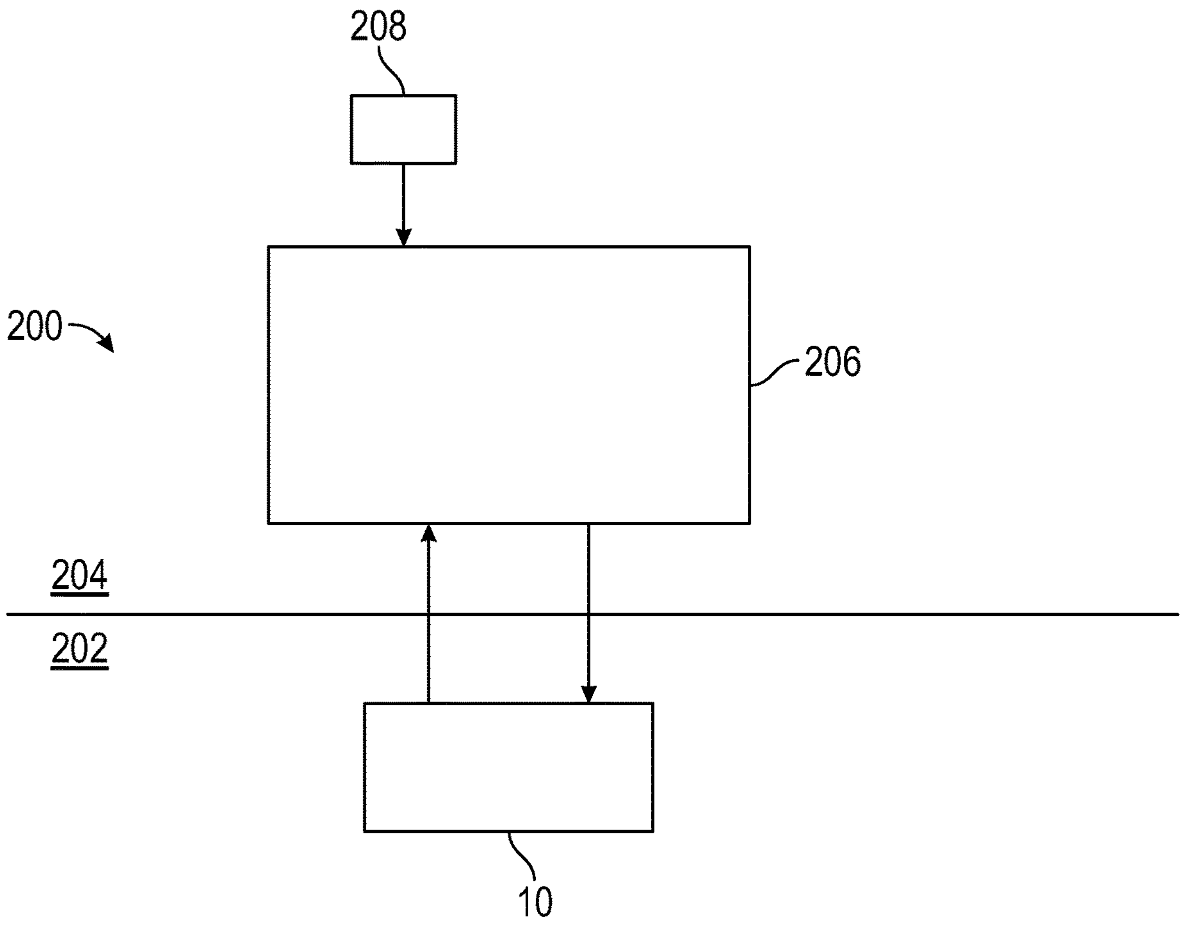
FIG. 2 shows a schematic view of an architecture of a system suitable for informing the vehicle of a road risk using crowd-sourced telemetric data, in an embodiment.

FIG. 2 shows a schematic view of an architecture of a system 200 suitable for informing the vehicle 10 of a road risk using crowd-sourced telemetric data, in an embodiment. The system 200 includes operation within a vehicle domain 202 and a cloud domain 204. The vehicle domain 202 includes the autonomous vehicle 10. The cloud domain 204 includes one or more remote servers 206. Information is sent back and forth between the autonomous vehicle 10 in the vehicle domain 202 and the one or more remote servers 206 in the cloud domain 204.

In the vehicle domain 202, the autonomous vehicle 10 obtains measurements about its operation, such as its velocity, acceleration, latitude, longitudinal, amount of braking, surface conditions, locations of detected targets, etc., using the sensing devices 40*a*-40*n*. These measurements are communicated to the one or more remote servers 206. In the cloud domain 204, the one or more remote servers 206 compute various risk parameters based from the measurements from the autonomous vehicle 10 and a profile of a road segment being traversed by the autonomous vehicle.

The profile can be received at the one or more remote servers 206 from a profile database or a profile service 208. The profile service 208 obtains telemetric data from a plurality of vehicles and organizes the data by road segment, time frame, etc. The profile is calculated to represent traffic along a selected road segment for a selected time period, such as an hour of the day, a quarter hour of the day, a seasonal time period, etc. In another embodiment, the one or more remote servers 206 can compile profile data on its own using telemetric data obtained from a plurality of vehicles traversing a road segment.

A profile represents an expected flow of traffic over the road segment for the time period. The road profile generally represents the stable flow of traffic over the road segment for the time period. The stable flow of traffic is flow of traffic in the absence of a destabilizing influence on the traffic flow, such as road work, an accident, bad road conditions, etc. Measurements made of the vehicle and of surrounding traffic over a road segment level are referred to herein as metrics. The metrics are interpreted using a model such as a Transportation Research Model to generate one or more properties. The one or more properties are used to generate a profile of the traffic flow, which is indicated by mean and standard deviation of the one or more properties.

The road profile for a road segment is represented by an average value (mean) and an expected variation (standard deviation) of one or more properties over the road segment for the time period. The properties can include, but are not limited to, travel speed uncertainty, pedal usage uncertainty, number of vehicles observed, average speed and speed changes, distribution of speeds and speed changes, hard braking and acceleration, number of full stops and number of idle stops.

The one or more remote servers 206 compile the measurements from the vehicle 10 and compare the calculated properties to the road profile to determine the degree to which each property departs from a stable flow of traffic for the selected road segment for a selected time.

The uncertainty a driver or the vehicle faces in a traffic stream can be represented by a distribution. For example, travel speed uncertainty can be obtained as an entropy value of the velocity distribution, as given by Eq. (1):

$$E[v]=-\Sigma(p_{v_i}\times\ln(p_{v_j})) \quad \text{Eq. (1)}$$

where $p_{v_i}$ is a probability associated with a given velocity vi. Similarly, pedal usage uncertainty can be obtained as an entropy value of the velocity change distribution, as given by Eq. (2):

$$E[dv]=-\Sigma(p_{dv_i}\times\ln(p_{dv_i})) \quad \text{Eq. (2)}$$

where $p_{dv_i}$ is a probability associated with a given deceleration or acceleration $dv_i$. For the entropies, a lower bound of zero represents complete consistency of a travel speed of the vehicle along a road segment. The upper bound represents complete uncertainty in the travel speed and a pedal usage needed to match the travel speed of the vehicle to the speed of the surrounding traffic flow. The entropy value is a property that can be calibrated to profile stable flow for a road segment for a given time period.

One or more remote servers 206 determine a disruption score based on the property values of travel speed uncertainty, pedal usage uncertainty, and vehicle flow. The disruption score can be used to identify an instability in traffic flow, such as an unexpected event that increases a level of headway dynamics. The disruption score is in indication of a level of disruption in the traffic flow. The disruption score as well as other data can be communicated from the one or more remote servers 206 to the autonomous vehicle 10. The disruption score can also be used to determine an instruction for the autonomous vehicle 10, and such instruction can be sent from the one or more remote servers 206 to the autonomous vehicle 10. The autonomous vehicle 10 can perform a navigational operation based on the instructions, disruption score, and/or other data from the one or more servers. Alternatively, if the autonomous vehicle 10 is being driven manually by a driver, the driver can read the instructions and operate the vehicle 10 accordingly.

Figure 3:
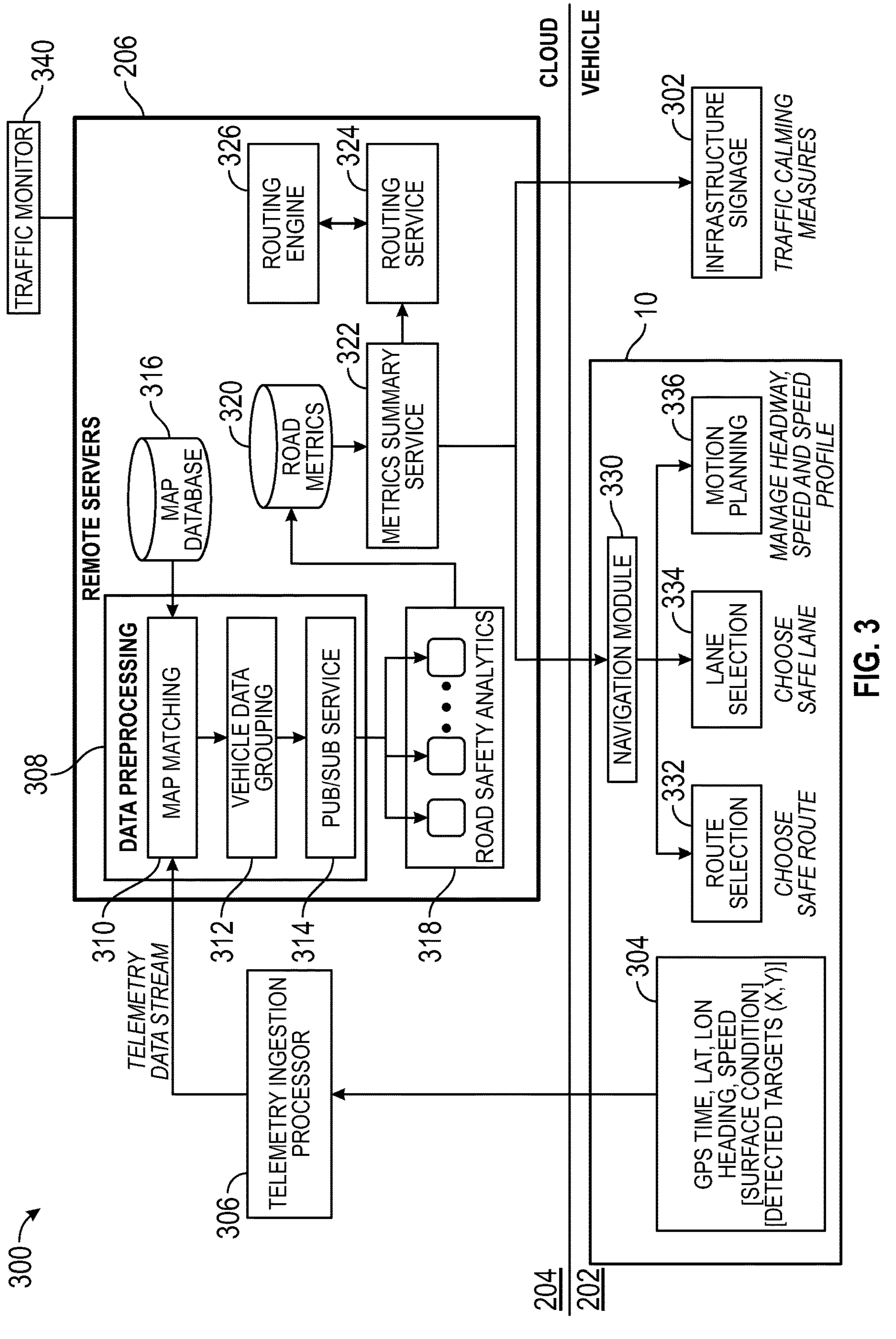
FIG. 3 shows a schematic diagram showing details of the system of FIG. 2.

FIG. 3 shows a schematic diagram 300 showing details of the system 200 of FIG. 2. The vehicle domain 202 includes the autonomous vehicle 10 and an infrastructure sign 302. The cloud domain 204 includes a telemetry ingestion processor 306 and the one or more remote servers 206.

The vehicle 10 includes at least a telemetric device 304 and a navigation module 330. The telemetric device 304 captures various telemetric data or measurements including, but not limited to, latitude of a road user, longitudinal of the road user, a timestamp, a heading of the road user, a speed or velocity of the road user, a surface condition of a road being traversed by the road user, any targets detected by the road user, etc. The telemetric device 304 communicates this telemetric data from the vehicle 10 to the cloud domain 204.

In the cloud domain 204, the telemetry ingestion processor 306 receives the telemetric data from the vehicle 10 and converts the format of the data to a format suitable for use at the remote servers 206. The telemetry ingestion processor 306 inputs data at regularly scheduled intervals, such as every three seconds, from the autonomous vehicle 10 to the one or more remote servers 206.

The one or more remote servers 206 process the data from the telemetry ingestion processor 306 to determine a risk assessment for the vehicle. The one or more remote servers 206 include a data preprocessor 308, a road safety analyzer 318, a road metrics database 320, a road summary service 322, a routing service 324 and a routing engine 326.

The data preprocessor 308 performs various operations to prepare the data for analysis, including map matching 310, vehicle data grouping 312 and data publication at a publication or subscription server 314. Map matching 310 includes comparing the longitude and latitude of the data to a map from a map database 316 in order to determine the location of the autonomous vehicle 10 at various times. While the autonomous vehicle 10 is within the road segment, the data preprocessor performs vehicle data grouping 312 in which the data is accumulated. Once the vehicle has left the road segment, the accumulated data is grouped as a trace representative of the road segment. The trace is published at a publication or subscription server 314. In general, the trace is published to the road safety analyzer 318.

The road safety analyzer 318 receives the trace from the data preprocessor 308 and performs various calculations. In particular, the road safety analyzer 318 compares the trace data to the road profile and determines one or more properties of the road segment from the trace. The road safety analyzer 318 also computes a performance value or disruption value associated with one or more properties and determines a likelihood of traffic disruption or of an adverse driver experience, such as stopped traffic stop-and-go traffic, etc. Operations of the road safety analyzer 318 are discussed herein with respect to FIG. 4.

The properties and disruption values determined at the road safety analyzer 318 can then be stored to the road metrics database 320. The road metrics database 320 provides a historical database that stores this data for a predetermined time frame and accumulates new data from other traces obtained by other vehicles over the time period. In various embodiments, the historical data can be held over a short time frame, such as 15 minutes, or over a long timeframe, such as one month.

The road summary service 322 pulls data from the road metrics database 320 to provide instructions for the autonomous vehicle 10. For example, when the vehicle 10 is traversing a road segment during a selected time period, the road summary service 322 can pull historical data from the road metrics database 320 for the selected road segment for the selected time period and supply this data to the vehicle 10. In particular, the road summary service 322 can provide a disruption value and/or road properties for the road segment to the vehicle 10. The road summary service 322 can also provide a notification signal upon comparison of the disruption value to a selected disruption threshold, such as when the disruption value is greater than the selected disruption threshold.

At the vehicle 10, the data and/or notification signal is received at a navigation module 330. The navigation module 330 can determine a course of action to implement at the vehicle 10. For example, the navigation module 330 can perform route selection 332 to choose a safer route than that of the road segment. Alternatively, the navigation module 330 can perform a lane selection 334 in order to change a lane in which the vehicle 10 is moving to a lane having a greater degree of safety. In addition, the navigation module 330 can manage the operation of the vehicle 10 by, for example, managing motion 336 such as a headway for the vehicle 10 and/or a speed, or speed profile, or a level of acceleration or deceleration of the vehicle 10, etc.

In another embodiment, the data and/or notification signal from the road summary service 322 can also be sent to the infrastructure sign 302, which can display this data or a suitable warning to the traffic at large. In another embodiment, the data and/or notification signal can be sent to a traffic monitor 340 or traffic monitoring device or server which is being observed by a traffic engineer or other user. The data and/or the notification signal can be shown at a display of the traffic monitor 340, such as at a dashboard operating at the display. The notification signal therefore controls a relation between the vehicle and the traffic flow over the road segment, generally in order to reduce a disruption in the traffic flow over the road segment. The notification sent to the traffic engineer can be used for analysis of the traffic flow in order to design new traffic regulations or traffic systems. The relation between the vehicle and the traffic flow is also achieved when the notification signal is sent to the infrastructure sign 302 to display a traffic flow warning or advisory to the traffic flow as well as when the notification signal is sent to the vehicle for control of the vehicle.

The routing service 324 of the one or more remote servers 206 receives data from the road summary service 322 and determines a complexity of the traffic pattern. The routing engine 326 can determine an alternate route based on a planned path or destination of the vehicle given the traffic pattern. The alternate route can be supplied to the autonomous vehicle 10.

Figure 4:
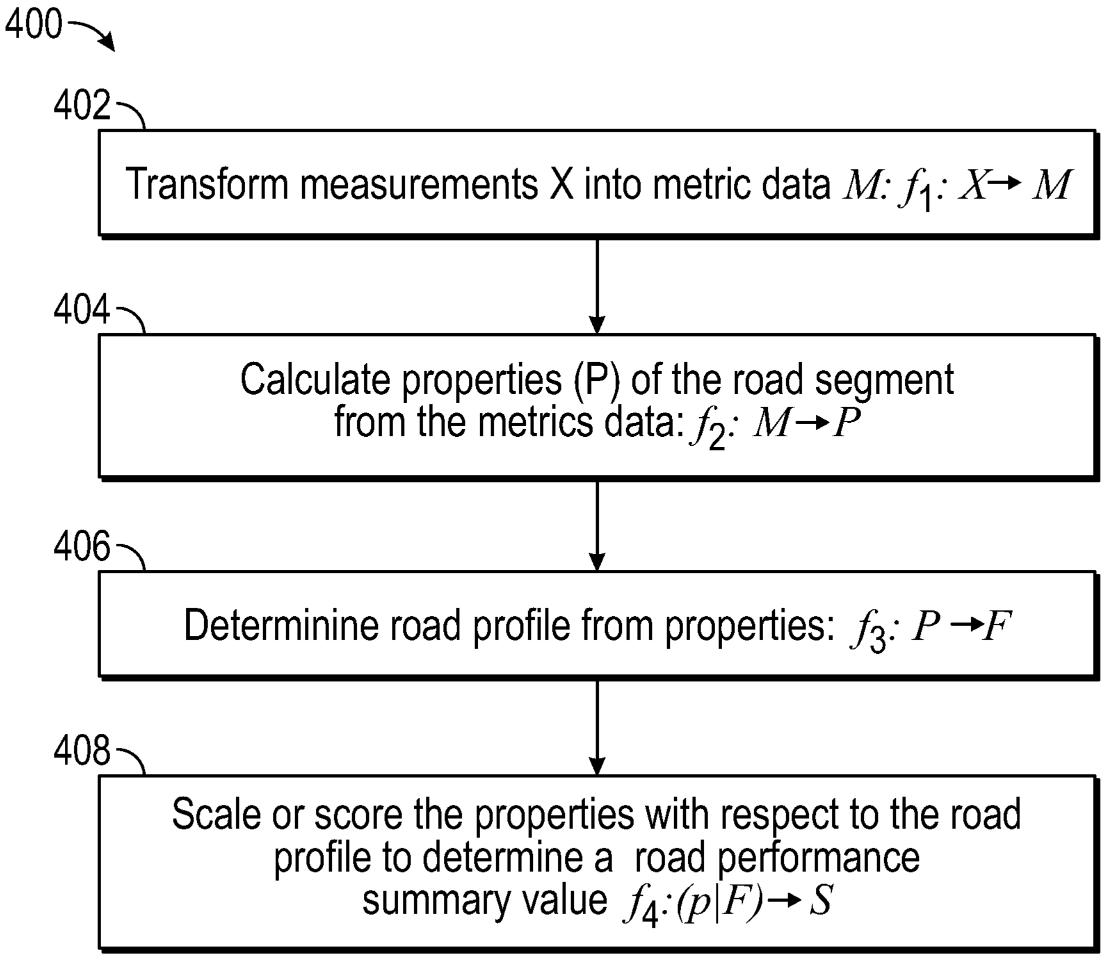
FIG. 4 shows a flowchart of the method performed at the road safety analyzer of FIG. 3.

FIG. 4 shows a flowchart 400 of the method performed at the road safety analyzer 318 of FIG. 3. In box 402, a statistical analysis or evaluation of the measurements X from the trace(s) are transformed into road metrics M. In box 404, the metrics M are used to determine one or more properties of the road segment (i.e., mean and standard deviation). In box 406 the properties are used to generate a profile F for the road segment. In box 408, the properties or property values are scaled or scored to determine their departure form an expected profile for the road segment. The properties are used to determine a road performance value for the road segment and time period. In one embodiment, the properties can be weighted using model coefficients for the road profile of the road segment. Each property value is multiplied by its corresponding weight and the products are summed to obtain the road performance value, as shown in Eq. (3):

$$S=\Sigma_{i=1}^{m}\omega_i \times p_i \qquad \text{Eq. (3)}$$

In box 408, the road performance value is used to determine a disruption score that describes a likelihood of an adverse driver experience along the road segment for the time period. The process shown in the flowchart 400 can be performed over a plurality of road segments and for a plurality of time periods.

Figure 5:
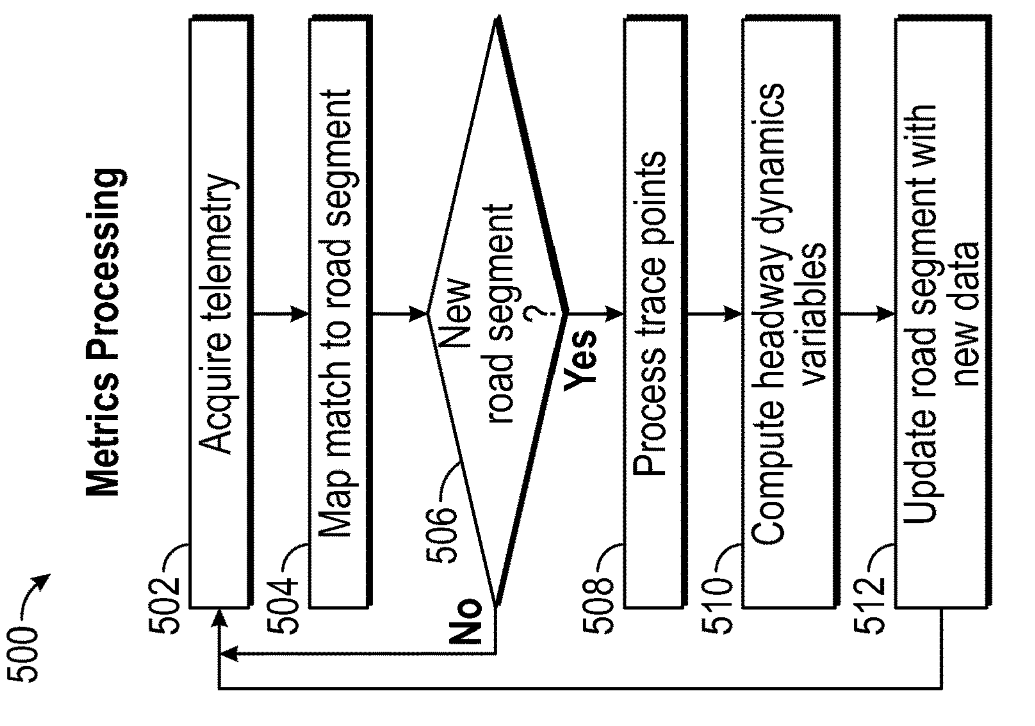
FIG. 5 shows a flowchart of a method for processing telemetric data to determine road properties.

FIG. 5 shows a flowchart 500 of a method for processing telemetric data to determine road properties. In box 502, the telemetric data is acquired. In box 504, the telemetric data is matched to a map. In box 506, a decision is made whether the vehicle is still in the road segment. If the vehicle has not left the road segment, the method returns to box 502 to acquire more telemetric data from the vehicle, thereby accumulating the telemetric data for the road segment. If the vehicle has left the road segment, the method then proceeds to box 508. In box 508, the accumulation of the telemetric data is completed and stored in a trace and the data is stored in a trace that is published to the road metrics analyzer. In box 510, properties of the road segment (such as headway dynamics variables) are computed from the trace data. In box 512, the properties are stored in the road metrics database 320 to update the data stored therein.

Figure 6:
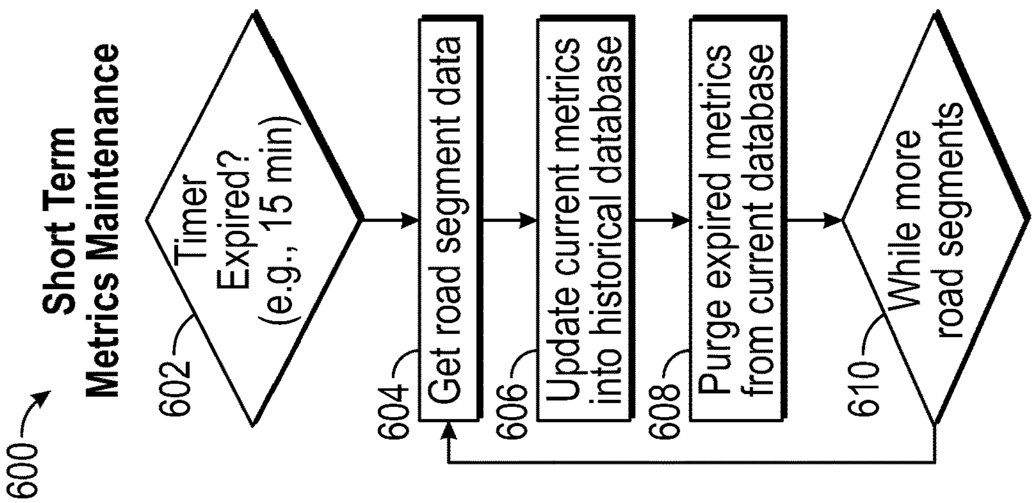
FIG. 6 shows a flowchart of a short-term maintenance routine performed on the historical data stored in the road metrics database.

FIG. 6 shows a flowchart 600 of a short-term maintenance routine performed on the historical data stored in the road metrics database 320. In box 602, a time is referred to in order to determine whether the data is older than a selected short time period, such as 15 minutes. If the time period has not expired, then the method proceeds to box 604. In box 604, road segment data is obtained for this time period. In box 606, the historical database is updated with the properties determined from the road segment data. In box 608, any metrics that are expired (i.e., older than the 15 minutes time period) are purged form the historical database. In box 610, a determination is made whether more data is being captured from additional road segments. If yes, then the method returns to box 604, where the additional road segment data is obtained. Otherwise, the method stops.

Figure 7:
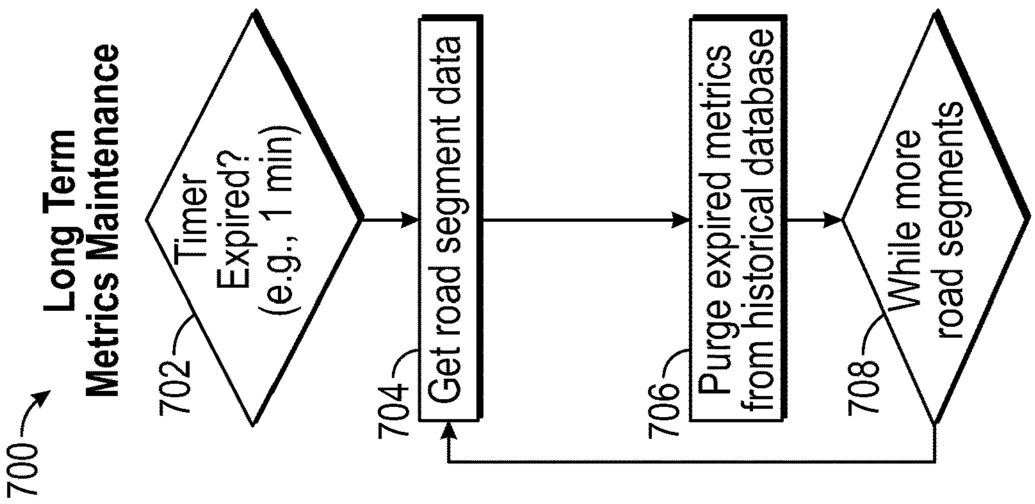
FIG. 7 shows a flowchart of a long-term maintenance routine performed on the historical data in the road metrics database.

FIG. 7 shows a flowchart 700 of a long-term maintenance routine performed on the historical data in the road metrics database 320. In box 702, a time is referred to in order to determine whether the data is older than a selected long time period, such as one month. In box 704, road segment data is obtained for the month-long time period. In box 706, any metrics that are expired (i.e., older than the one-month time period) are purged form the historical database. In box 708, a determination is made whether more data is being captured from additional road segments. If yes, then the method returns to box 704, where the additional road segment data is obtained. Otherwise, the method stops.

Figure 8:
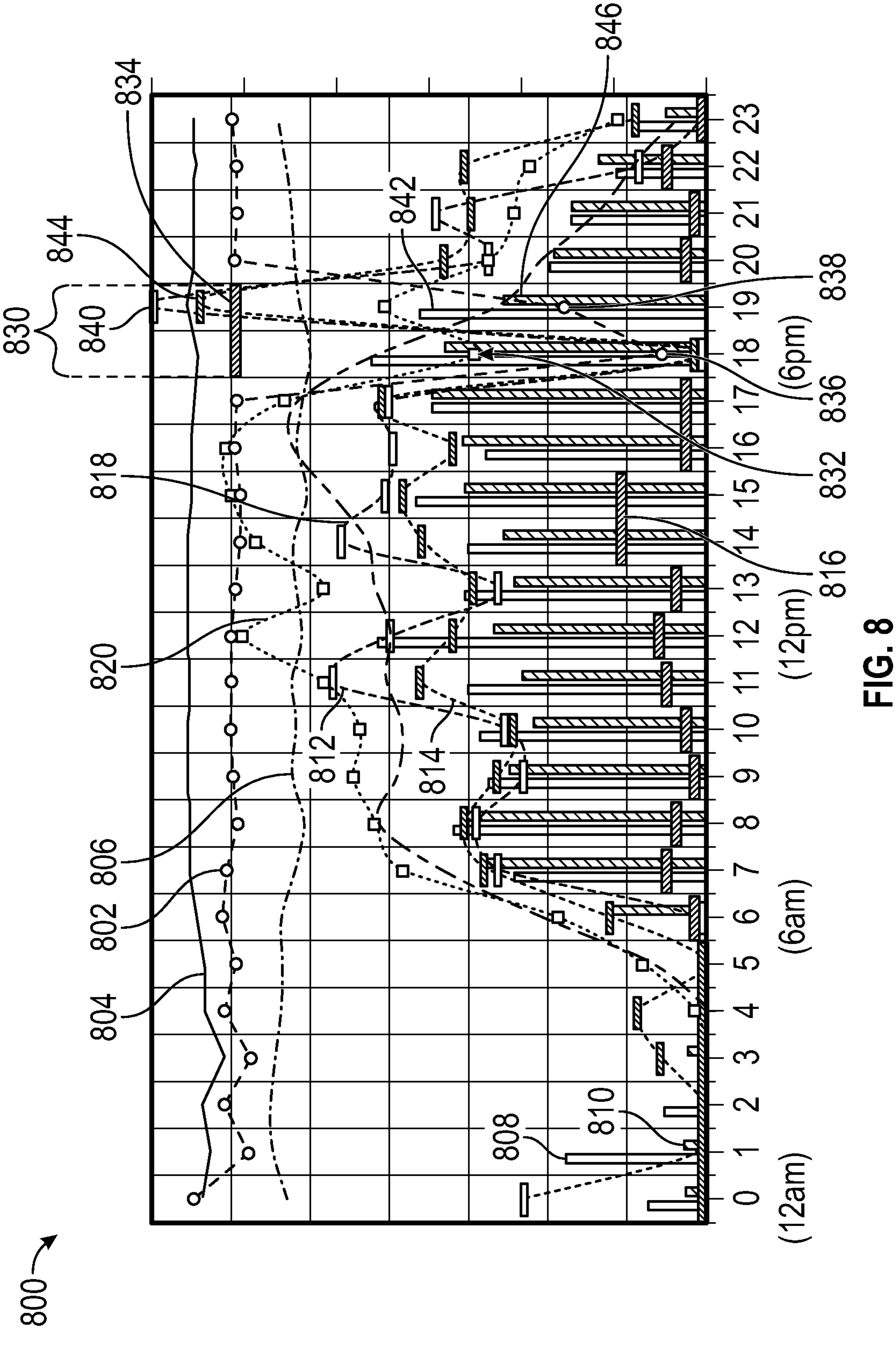
FIG. 8 shows a time chart for a selected road segment.

FIG. 8 shows a time chart 800 for a selected road segment, such as road segment of a freeway. The time chart 800 illustrates various properties calculated over a 24-hour time period for the selected segment and compares selected properties against an expected profile. Time is shown along the x-axis and is partitioned into 24 one-hour time segments. Properties are shown for each time segment. The traffic pattern represented in the time chart 800 shows a low amount of traffic during early morning hours (bin 0 to bin 5, about 12 midnight to 6:00 a.m.), During this time, there is a low amount of traffic and traffic tends to flow unimpeded. A morning traffic rush is shown in bin 6 through bin 9 (about 6:00 a.m. to 10:00 a.m.). A midday business traffic is shown in bins 10 through 14 (about 10:00 am. to: 3:00 p.m.). An afternoon rush traffic is shown from bin 15 to bin 18 (about 3:00 p.m. to 7:00 p.m.). Night-time traffic is shown from bin 19 to bin 23 (about 7:00 p.m. to 12 midnight).

Average velocity curve 802 shows an average velocity (v) for vehicles on the road segment over the 24-hour time period. First deviation curve 804 shows a first standard deviation of the average velocity and second deviation curve 806 shows a second standard deviation of the average velocity. Only the upper limit of the first deviation of the average velocity is shown for illustrative purposes. Similarly, only the lower limit of the second deviation of the average velocity is shown for illustrative purposes.

A velocity entropy profile 808 is shown for each of the one-hour time periods. Also, an acceleration entropy profile 810 is shown for each of the one-hour time periods. The velocity entropy profile 808 and the acceleration entropy profile 810 are both represented within a one-hour time period as a bar extending vertically, with the height of the bar indicating a value of the entropy. The velocity entropy profile 808 and the acceleration entropy profile 810 for a selected time segment can be determined from historical data obtained during the selected time segment for a selected time period, such as a week, a month, etc. Also shown is the actual velocity entropy 812 and the actual acceleration entropy 814, which are obtained from current telemetric data.

The number of hard braking events 816 within a one-hour period is represented by a bar. Expected vehicle density curve 818 shows an expected vehicle density on the road segment during a time period. Actual vehicle density curve 820 shows an actual vehicle density on the road segment during the particular 24-hour period of the time chart.

During the early morning hours (about 12 midnight to 6:00 a.m.), the traffic exhibits an expected vehicle movement. The average velocity curve 802 is relatively constant and generally represents a free flow traffic pattern. The number of vehicles (actual vehicle density curve 820) on the road segment is relatively low, as expected. The actual velocity entropy 812 and the actual acceleration entropy 814 are close to the velocity entropy profile 808 and the acceleration entropy profile 810, respectively.

During the morning rush hour (about 6:00 a.m. to 10:00 a.m.), the number of vehicles (actual vehicle density curve 820) increases, as expected. The actual velocity entropy 812 and the actual acceleration entropy 814 remain close to the velocity entropy profile 808 and the acceleration entropy profile 810, respectively. The average velocity curve 802 during thus morning rush hour still exhibits a free flow of traffic.

During the midday business hours (about 10:00 a.m. to 3:00 p.m.), the actual vehicle density curve 820 can be seen to increase over the vehicle density of the morning rush hour. The average velocity still exhibits a free flow of traffic. The actual velocity entropy is highly elevated over the velocity entropy profile for various one-hour time periods (i.e., at least in bins 11 and 14). Similarly, the actual acceleration entropy 814 is highly elevated over the acceleration entropy profile 810 for these same one-hour time periods.

During the afternoon business hours (about 3:00 p.m. to 7:00 p.m.) a wreck occurs at about 6:19 p.m. The after-effects of the wreck are shown in the time period 830. As a result of the wreck, the vehicles are slowed down (local velocity minimum 836) and a recorded 51 hard braking events are recorded (bar 834). In the time graph, the actual vehicle density curve 820 drops in bin 18 (as indicated by local vehicle density minimum 832). The actual velocity entropy 812 is reduced in bin 18 (5:00 p.m. to 6:00 p.m.) to relatively low values (in comparison to the velocity entropy profile 808 in bin 18). Similarly, the actual acceleration entropy 814 is reduced in bin 18 to relatively low values (in comparison to the acceleration entropy profile 810). As shown by local velocity minimum 836, the velocity has dropped to very low values and is considerably outside of the range set by the second deviation curve 806 for the average velocity curve 802.

During the night-time traffic hours (about 7:00 p.m. to 12 midnight), the traffic has recovered from the vehicle wreck. The local velocity entropy 840 for bin 19 exceeds the local velocity entropy profile 842 for bin 19. Additionally, the local acceleration entropy 844 for bin 19 exceeds the local acceleration entropy profile 846 for bin 19. As shown by velocity point 838, the average velocity for bin 19 is greater than in the one-hour time period of bin 18 (local velocity minimum 836). However, the average velocity for bin 19 remains low and is still outside the range set by the second standard deviation for the average velocity. In addition, the actual vehicle density has increased in bin 19 from the local vehicle density minimum 832 in of bin 18.

FIG. 9 shows a table 900 having various properties and related scaled or scored values. The properties are tabulated for a plurality of road segments recorded over a selected time of day for two consecutive days. Road segments are labelled 1 through 7. The first day (Sep. 18, 2019) is shown in the first 7 rows and the second day (Sep. 19, 2019) is shown in the second 7 rows. As shown for the first day, the road segments 4 and 5 (circle 906) both have a decrease in velocity in comparison to road segments 1-3 and 6-7 (circle 908). A disruption score for road segment 4 is 96 and for road segment 5 is 90 (circle 910).

As shown for the second day (Sep. 19, 2019), an accident occurs on road segment 4. Velocity decreases over road segments 4 and 5 (circle 912) compared to road segments 1-3 and 6-7. The disruption score for road segment 4 is at 100 (circle 914), indicating the occurrence of an instability, disruption or disruptive event over road segment 4. The disruption score for the second day can be used by the vehicle to select an action, such as changing lanes or changing a route away from the road segment 4.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of controlling a relation between a vehicle and traffic flow over a road segment, comprising obtaining telemetric data from the vehicle within the road segment, the telemetric data related to the road segment;

determining a property of the road segment based on the telemetric data and a road profile for the road segment;

determining a disruption score indicative of a level of disruption in the traffic flow for the road segment based on the property, a travel speed uncertainty and a pedal usage uncertainty, wherein the travel speed uncertainty is defined by $E[v]=-\Sigma(p_{v_i}\times\ln(p_{v_i}))$, where $P_{vi}$ is a probability associated with a given velocity $_{vi}$, and wherein the pedal usage uncertainty is defined by $E[dv]=-\Sigma(p_{dv_i}\times\ln(p_{dv_i}))$, where $P_{dvi}$ is a probably associated with a given deceleration or acceleration $_{dv}$; and outputting a notification signal when the disruption score is above a selected disruption threshold, the notification signal usable for controlling the relation between the vehicle and the traffic flow.

2. The method of claim 1, further comprising outputting the notification signal to at least one of: (i) a display on a traffic monitoring device for analysis of the traffic flow; (ii) a sign to be displayed to the traffic flow; and (iii) the vehicle for navigating the vehicle with respect to the traffic flow.

3. The method of claim 2, wherein navigating the vehicle further comprises at least one of: (i) selecting an alternate route for the vehicle; (ii) changing a lane in which the vehicle is moving; (iii) changing a headway dynamic for the vehicle; (iv) changing a speed of the vehicle; and (v) changing a speed profile of the vehicle.

4. The method of claim 1, further comprising accumulating the telemetric data from the vehicle at regular intervals while the vehicle is on the road segment, storing the accumulated telemetric data to a trace for the vehicle and determining the property of the road segment from the trace.

5. The method of claim 1, wherein the road profile represents an expected flow of traffic over the road segment in an absence of a disruptive event.

6. The method of claim 1, further comprising transmitting the telemetric data to a remote server and determining the property of the road segment and determining a disruption value at the remote server.

7. The method of claim 1, further comprising storing the properties in a road metrics database and purging the properties from the road metrics database after a selected time period has expired.

8. A system for controlling a relation between a vehicle and a traffic flow over a road segment, comprising:

a telemetric device of the vehicle for obtaining telemetric data related to the road segment being traversed by the vehicle; and a processor configured to:

determine a property of the road segment based on the telemetric data and a road profile for the road segment;

determine a disruption score indicative of a level of disruption in the traffic flow for the road segment based on the property, a travel speed uncertainty and a pedal usage uncertainty, wherein the travel speed uncertainty is defined by $E[v]=-\Sigma(p_{v_i}\times\ln(p_{v_i}))$, where $P_{vi}$ is a probability associated with a given velocity $_{vi}$, and wherein the pedal usage uncertainty is defined by $E[dv]=-\Sigma(p_{dv_i}\times\ln(p_{dv_i}))$, where $P_{dvi}$ is a probably associated with a given deceleration or acceleration $_{dv}$; and output a notification signal when the disruption score is above a selected disruption threshold, the notification signal usable for controlling the relation between the vehicle and the traffic flow.

9. The system of claim 8, wherein the processor is further configured to output the notification signal to at least one of: (i) a display on a traffic monitoring device for analysis of the traffic flow; (ii) a sign to be displayed to the traffic flow; and (iii) the vehicle for navigating the vehicle with respect to the traffic flow.

10. The system of claim 9, wherein the processor is further configured to navigate the vehicle by performing at least one of: (i) selecting an alternate route for the vehicle; (ii) changing a lane in which the vehicle is moving; (iii) changing a headway dynamic for the vehicle; (iv) changing a speed of the vehicle; and (v) changing a speed profile of the vehicle.

11. The system of claim 8, wherein the processor is further configured to accumulate the telemetric data from the vehicle at regular intervals while the vehicle is on the road segment, store the accumulated telemetric data to a trace for the vehicle and determine the property of the road segment from the trace.

12. The system of claim 8, wherein the road profile represents an expected flow of traffic over the road segment in an absence of a disruptive event.

13. The system of claim 8, further comprising a road metrics database, wherein the processor is further configured to store the properties in the road metrics database and purges the properties from the road metrics database after a selected time period has expired.

14. A server for controlling a relation between a vehicle and a traffic flow over a road segment, comprising:

a processor configured to:

receive telemetric data from the vehicle, the telemetric data being related to the road segment being traversed by the vehicle;

determine a property of the road segment based on the telemetric data and a road profile for the road segment;

determine a disruption score indicative of a level of disruption in the traffic flow for the road segment based on the property, a travel speed uncertainty and a pedal usage uncertainty, wherein the travel speed uncertainty is defined by $E[v]=-\Sigma(p_{v_i}\times\ln(p_{v_i}))$, where $P_{vi}$ is a probability associated with a given velocity $_{vi}$, and wherein the pedal usage uncertainty is defined by $E[dv]=-\Sigma(p_{dv_i}\times\ln(p_{dv_i}))$, where $P_{dvi}$ is a probably associated with a given deceleration or acceleration $_{dv}$; and output a notification signal when the disruption score is above a selected disruption threshold, the notification signal usable for controlling the relation between the vehicle and the traffic flow.

15. The server of claim 14, wherein the processor is further configured to output the notification signal to at least one of: (i) a display on a traffic monitoring device for analysis of the traffic flow; (ii) a sign to be displayed to the traffic flow; and (iii) the vehicle for navigating the vehicle with respect to the traffic flow.

16. The server of claim 15, wherein the processor is further configured to navigate the vehicle by performing at least one of: (i) selecting an alternate route; (ii) changing a lane in which the vehicle is moving; (iii) changing a headway dynamic; (iv) changing a speed of the vehicle; and (v) changing a speed profile of the vehicle.

17. The server of claim 14, wherein the processor is further configured to accumulate the telemetric data from the vehicle at regular intervals while the vehicle is on the road segment, store the accumulated telemetric data to a trace for the vehicle and determine the property of the road segment from the trace.

18. The server of claim 14, wherein the road profile represents an expected flow of traffic over the road segment in an absence of a disruptive event.

19. The server of claim 14, further comprising a road metrics database, wherein the processor is further configured to store the properties in the road metrics database and purges the properties from the road metrics database after a selected time period has expired.

20. The server of claim 14, wherein the processor is further configured to obtain the road profile from one of (i) a plurality of other vehicles traversing the road segment; and (a) a profile service.

* * * * *